United States Patent
Armiento et al.

(10) Patent No.: US 8,449,237 B2
(45) Date of Patent: May 28, 2013

(54) KNURLED PIN FASTENER AND METHOD OF FORMING A KNURLED PIN FASTENER

(75) Inventors: Alan J. Armiento, New Rochelle, NY (US); Douglas L. Rose, Sherman, CT (US)

(73) Assignee: Black & Decker Inc., Newark, DE (US)

( * ) Notice: Subject to any disclaimer, the term of this patent is extended or adjusted under 35 U.S.C. 154(b) by 664 days.

(21) Appl. No.: 12/696,494

(22) Filed: Jan. 29, 2010

(65) Prior Publication Data

US 2011/0188971 A1 Aug. 4, 2011

(51) Int. Cl.
*F16B 15/00* (2006.01)
(52) U.S. Cl.
USPC ........... 411/487; 411/453; 411/489; 411/490; 411/498
(58) Field of Classification Search
USPC .............. 411/451.1, 453, 487, 489, 490, 493, 411/498, 499; 470/27, 34, 38
See application file for complete search history.

(56) References Cited

U.S. PATENT DOCUMENTS

| | | | | |
|---|---|---|---|---|
| 276,541 A * | 4/1883 | Sloan | ............................. | 411/453 |
| 2,223,871 A * | 12/1940 | Johnson | ......................... | 411/453 |
| 2,920,563 A * | 1/1960 | De Caro | ......................... | 102/293 |
| 3,377,903 A * | 4/1968 | Korte | ............................. | 411/441 |
| 3,480,306 A * | 11/1969 | Yung | ............................. | 403/281 |
| 3,505,919 A * | 4/1970 | Elmar | ............................. | 411/440 |
| 5,443,345 A * | 8/1995 | Gupta | ............................. | 411/441 |
| 6,171,042 B1 | 1/2001 | Olvera et al. | | |
| 6,203,442 B1 | 3/2001 | Olvera et al. | | |
| 6,805,525 B2 * | 10/2004 | Oswald | ......................... | 411/499 |
| 6,851,906 B2 * | 2/2005 | Gassmann et al. | ............. | 411/440 |
| 6,872,042 B2 * | 3/2005 | Panasik et al. | ................ | 411/481 |
| 7,232,283 B2 * | 6/2007 | Dill et al. | ...................... | 411/453 |
| 7,520,710 B2 | 4/2009 | Ortler et al. | | |
| 2012/0219382 A1* | 8/2012 | Aihara et al. | ................. | 411/487 |

\* cited by examiner

*Primary Examiner* — Roberta Delisle

(74) *Attorney, Agent, or Firm* — Cantor Colburn LLP

(57) ABSTRACT

A pin fastener includes a body having a first end that extends to a second end through an intermediate portion. The intermediate portion includes a first substantially constant diameter section that extends from the first end toward the second end, a first tapered section that extends from the first substantially constant diameter section, a second substantially constant diameter section that extends from the first tapered section, and a second tapered section that extends from the second substantially constant diameter portion to the second end. The pin fastener further includes a knurled section formed in the second substantially constant diameter portion.

17 Claims, 1 Drawing Sheet

KNURLED PIN FASTENER AND METHOD OF FORMING A KNURLED PIN FASTENER

BACKGROUND

The subject matter disclosed herein relates to the art of pin fasteners and, more particularly, to a knurled pin fastener for attaching objects or structures to a substrate.

Fastener setting tools have become common in the construction industry. The ability to fully drive a fastener with just the pull of a trigger is significantly more efficient than methods of hammering in, or screwing in fasteners. Fasteners are provided in a wide variety of configurations in order to meet industry demands. Fasteners are designed to penetrate wood, concrete, masonry, aluminum, and steel to name just a few applications. Fasteners are designed not only to penetrate a substrate, but also to resist being pulled out from the substrate. In order to enhance penetration, conventional fastener pins include a tapered portion that extends to a penetrating tip. In order to enhance pull-out resistance, the tapered portion of many fastener pins includes a knurled section. Once driven, the knurled section cooperates with the substrate to resist pull-out.

SUMMARY

In accordance with an exemplary embodiment, a pin fastener includes a body having a first end that extends to a second end through an intermediate portion. The intermediate portion includes a first substantially constant diameter section that extends from the first end toward the second end, a first tapered section that extends from the first substantially constant diameter section, a second substantially constant diameter section that extends from the first tapered section, and a second tapered section that extends from the second substantially constant diameter portion to the second end. The pin fastener further includes a knurled section formed in the second substantially constant diameter portion.

In accordance with an exemplary embodiment, a method of forming a pin fastener includes creating a pin body having a first end that extends to a second end through an intermediate portion, forming the intermediate portion to include a first substantially constant diameter section that extends from the first end, a first tapered section that extends from the first substantially constant diameter section, a second substantially constant diameter section that extends from the first tapered section, and a second tapered section that extends from the second substantially constant diameter portion to the second end, and knurling a section of the second substantially constant diameter portion.

BRIEF DESCRIPTION OF THE DRAWINGS

Referring now to the drawings wherein like elements are numbered alike in the Figures.

DETAILED DESCRIPTION

Figure 1:
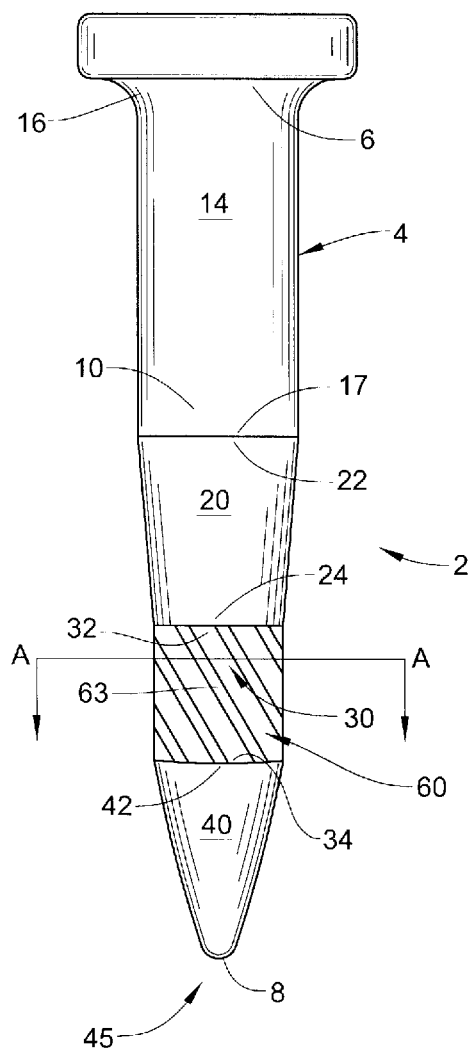
FIG. 1 is a plan view of a knurled pin fastener in accordance with an exemplary embodiment.
Figure 2:
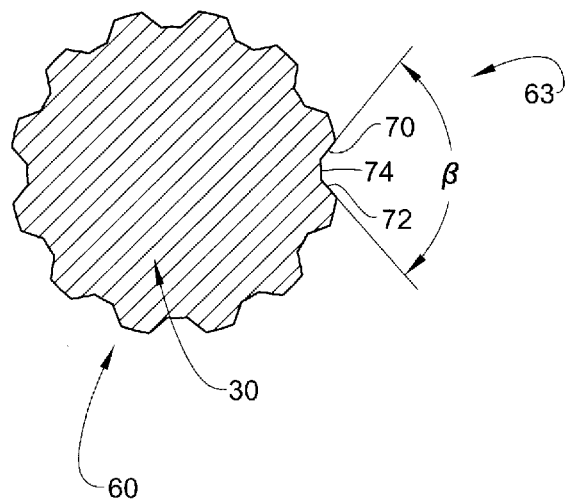
FIG. 2 is a plan view of a cross section of the knurled pin fastener of FIG. 1 taken at section A-A.

Referring to FIG. 1, a pin fastener constructed in accordance with an exemplary embodiment is indicated generally at 2. Pin fastener 2 includes a body 4 having a first end 6 that extends to a second end 8 through an intermediate portion 10. Intermediate portion 10 includes a first substantially uniform or constant diameter section 14 having a first end portion 16 that extends from first end 6 to a second end portion 17. A first tapered section 20 extends from first substantially uniform or constant diameter section 14. More specifically, first tapered section 20 includes a first end section 22 that extends from second end portion 17 to a second end section 24. As will be discussed more fully below, first tapered section 20 includes a taper between about 4° to about 12°. In accordance with one aspect of the exemplary embodiment, the taper is between about 6° and about 10°. In accordance with another aspect of the exemplary embodiment, the taper is about 8°.

Intermediate portion 10 also includes a second uniform or constant diameter section 30 that extends from first tapered portion 20. Second constant diameter section 30 includes a first end zone 32 that extends from second end portion 24 to a second end zone 34. Finally, a second tapered section 40 extends from second constant diameter portion 30. Second tapered section 40 includes a first end segment 42 that extends from second end zone 34 to second end 8. Second tapered section 40 defines a tip 45 for pin fastener 2. In accordance with one aspect of the exemplary embodiment, tip 45 is constitutes a ballistic point. That is, tip 45 is heat treated to form a particularly hard surface and shaped top have a generally ogive profile. More specifically, tip 45 is double drawn to form a hard surface to define the generally ogive profile.

In further accordance with the exemplary embodiment, pin fastener 2 includes a knurled section 60 provided on second constant diameter section 30. Knurled section 60 includes a plurality of helical grooves 63 having a pitch of between about 20° and about 40°. In accordance with one aspect of the exemplary embodiment, the pitch is between about 25° and about 35°. In accordance with another aspect of the exemplary embodiment, the pitch is about 30°. Each helical groove 60 includes a first flank 70 that extends to a second flank 72 through a radius portion 74 thereby defining a gear type knurl. Each helical groove 60 includes an angle β between first and second flanks 70 and 72. In accordance with one aspect of the exemplary embodiment, the angle β is between about 80° and about 120°. In accordance with another aspect of the exemplary embodiment, angle β is between about 90° and about 110°. In accordance with yet another aspect of the exemplary embodiment, angle β is about 100°.

With this construction, pin fastener 2 is driven into a substrate such that knurled section 60 substantially limits pull out. That is, when driven, first tapered section 20 slows pin fastener 2 causing knurled section 60 to bury into the substrate. More specifically, the particular taper of first tapered section 20 ensures that pin fastener 2 is slowed causing the plurality of helical grooves to stop and embed into the substrate. The particular design of knurled section 60 ensures that the substrate melds with the plurality of helical groove 63. More specifically, when driven into a steel substrate for example, friction created by the penetration of pin fastener 2 causes a portion of the steel to melt and meld with knurled section 60. Also, by limiting the plurality of helical grooves to a constant diameter portion of pin fastener 2, pull out is further reduced. That is, when knurling tapered portions of a fastener, a slight movement shifts the taper from the corresponding bore lessening any frictional contact. In this manner, tapered portions have a very low pull out resistance. Forming the taper on the constant diameter portion ensures that small movements do not lessen frictional contact between the fastener and the substrate thereby advantageously enhancing pull out resistance.

Finally it is to be understood while one or more embodiments have been shown and described, modifications and substitutions may be made thereto without departing from the spirit and scope of the invention. Accordingly, it is to be understood that the present invention has been described by way of illustrations and not limitation.

The invention claimed is:

1. A pin fastener comprising:
   a body including a first end that extends to a second end through an intermediate portion, the intermediate portion including a first substantially constant diameter section that extends from the first end toward the second end, a first tapered section that extends from the first substantially constant diameter section, a second substantially constant diameter section that extends from the first tapered section, and a second tapered section that extends from the second substantially constant diameter portion to the second end; and
   a knurled section including a plurality of helical grooves formed on the second substantially constant diameter portion, wherein the plurality of helical grooves include first and second flank portions joined by a radius portion, the plurality of helical grooves including an angle between the first flank portion and the second flank portion.

2. The pin according to claim 1, wherein the plurality of helical grooves include a pitch of between about 20° and about 40°.

3. The pin according to claim 1, wherein the plurality of helical grooves include a pitch of between about 25° and about 35°.

4. The pin according to claim 1, wherein the plurality of helical grooves include a pitch of about 30°.

5. The pin according to claim 1, wherein the angle between the first and second flank portions is between about 80° and about 120°.

6. The pin according to claim 1, wherein the angle between the first and second flank portions is between about 90° and about 110°.

7. The pin according to claim 1, wherein the angle between the first and second flank portions is about 100°.

8. The pin according to claim 1, wherein the first tapered section includes a taper of between about 4° to about 12° from the first substantially constant diameter section toward the second substantially constant diameter portion.

9. The pin according to claim 1, wherein the first tapered section includes a taper of between about 6° to about 10° from the first substantially constant diameter section toward the second substantially constant diameter portion.

10. The pin according to claim 1, wherein the first tapered section includes a taper of about 8° from the first substantially constant diameter section toward the second substantially constant diameter portion.

11. The pin according to claim 1, further comprising: a head positioned at the first end.

12. The pin according to claim 1, further comprising: a tip provided at the second end.

13. The pin according to claim 12, wherein the tip comprises a ballistic point having a generally ogive profile.

14. A method of forming a pin fastener, the method comprising:
    creating a pin body having a first end that extends to a second end through an intermediate portion;
    forming the intermediate portion to include a first substantially constant diameter section that extends from the first end, a first tapered section that extends from the first substantially constant diameter section, a second substantially constant diameter section that extends from the first tapered section, and a second tapered section that extends from the second substantially constant diameter portion to the second end; and
    knurling a plurality of helical grooves in the second substantially constant diameter portion, the plurality of helical grooves including first and second flank portions joined by a radius portion, the plurality of helical grooves having an angle between the first flank portion and the second flank portion, the angle being between about 80° and about 120°.

15. The method of claim 14, wherein knurling the plurality of helical grooves in the second substantially constant diameter portion includes forming the plurality of helical grooved having a pitch of between about 20° and about 40°.

16. The method of claim 14, further comprising: tapering the first tapered section between about 4° to about 12° from the first substantially constant diameter section toward the second substantially constant diameter portion.

17. The method of claim 14, further comprising: forming a head at the first end and a ballistic point having a generally ogive profile at the second end.

* * * * *